(12) United States Patent
Nishiyama

(10) Patent No.: US 7,729,512 B2
(45) Date of Patent: Jun. 1, 2010

(54) STEREO IMAGE PROCESSING TO DETECT MOVING OBJECTS

(75) Inventor: Manabu Nishiyama, Kawasaki (JP)

(73) Assignee: Kabushiki Kaisha Toshiba, Minato-Ku, Tokyo (JP)

( * ) Notice: Subject to any disclaimer, the term of this patent is extended or adjusted under 35 U.S.C. 154(b) by 1107 days.

(21) Appl. No.: 11/384,827

(22) Filed: Mar. 21, 2006

(65) Prior Publication Data

US 2006/0215903 A1 Sep. 28, 2006

(30) Foreign Application Priority Data

Mar. 23, 2005 (JP) ............................. 2005-084479

(51) Int. Cl.
*G06K 9/00* (2006.01)
(52) U.S. Cl. ...................... 382/103; 382/100; 382/106; 382/107; 382/154; 382/224
(58) Field of Classification Search ................. 382/100, 382/103, 104, 106, 107, 154
See application file for complete search history.

(56) References Cited

U.S. PATENT DOCUMENTS

| 5,103,305 | A | * | 4/1992 | Watanabe | 382/236 |
| 5,727,078 | A | * | 3/1998 | Chupeau | 382/154 |
| 6,072,903 | A | * | 6/2000 | Maki et al. | 382/190 |
| 7,251,346 | B2 | * | 7/2007 | Higaki et al. | 382/106 |
| 7,366,325 | B2 | * | 4/2008 | Fujimura et al. | 382/104 |
| 7,403,634 | B2 | * | 7/2008 | Nishiura | 382/103 |
| 2004/0252862 | A1 | * | 12/2004 | Camus et al. | 382/104 |

FOREIGN PATENT DOCUMENTS

| JP | 9-185720 | 7/1997 |
| JP | 2004-299025 | 10/2004 |
| JP | 2004-301607 | 10/2004 |

OTHER PUBLICATIONS

Office Action dated May 13, 2008 in JP Patent Application Serial No. 2005-084479 with English translation.

* cited by examiner

*Primary Examiner*—Matthew C Bella
*Assistant Examiner*—Eric Rush
(74) *Attorney, Agent, or Firm*—Nixon & Vanderhye PC (57) ABSTRACT

A first image and a second image are obtained by sensing an image of a moving object from two different viewpoints using a first imaging device and a second imaging device. A plurality of feature points are detected from the first image. A disparity distribution representing a disparity for each feature point is obtained by performing stereo image processing using the first image and the second image. A threshold is determined for disparities in the disparity distribution. A feature point having a disparity exceeding the threshold in the disparity distribution is classified as an intra-moving-object feature point. An image area of the moving object in the first image is detected by using the intra-moving-object feature point.

11 Claims, 4 Drawing Sheets

FIG. 8

STEREO IMAGE PROCESSING TO DETECT MOVING OBJECTS

CROSS-REFERENCE TO RELATED APPLICATIONS

This application is based upon and claims the benefit of priority from prior Japanese Patent Application No. 2005-084479, filed Mar. 23, 2005, the entire contents of which are incorporated herein by reference.

BACKGROUND OF THE INVENTION

1. Field of the Invention

The present invention relates to an image processing apparatus and method which perform stereo image processing for a plurality of images obtained by image-sensing a moving object from different points and detect the moving object on the image.

2. Description of the Related Art

Various kinds of research and development have been conducted concerning the visual processing systems of moving robots which follow persons. When a moving robot moves to follow a moving object such as a person, the visual processing system senses the object image first, and then measures its 3D position by image processing. The robot calculates a controlled variable or the like for a driving system for movement in accordance with the measurement result.

Conventionally, there have been known a person detection technique based on background subtraction which has been used for monitoring systems and the like and a technique of recognizing the head of a person by image processing. These techniques may be applied to the visual processing systems of moving robots.

As a robot moves, however, a large change in background image occurs. The background subtraction method is not therefore suitable for the visual processing systems of moving robots. In addition, the head portion of an object is not always present in the visual range of the robot depending on the positional relationship with the person, the presence of an obstacle, or the like, and hence the person's head recognition technique is not effective either.

Furthermore, in consideration of the activities of a moving robot in a human living space, it is necessary for the robot to realize high-speed processing by reducing data to be processed and be robust against environmental changes.

Note that as person detection techniques independent of scene changes, techniques using distance images and inter-frame differences are disclosed in, for example, Jpn. Pat. Appln. KOKAI Nos. 2004-299025 and 2004-301607.

BRIEF SUMMARY OF THE INVENTION

One aspect of the present invention is directed to an image processing apparatus including an image acquiring device which acquires a first image and a second image obtained by sensing an image of a moving object from two different viewpoints using a first imaging device and a second imaging device.

A first detecting device detects a plurality of feature points from the first image. A stereo image processing device obtains a disparity distribution representing a disparity for each feature point by performing stereo image processing using the first image and the second image. A first determining device determines a threshold for the disparities in the disparity distribution.

A classifying device classifies a feature point having a disparity exceeding the threshold in the disparity distribution as an intra-moving-object feature point. A second detecting device detects an image area of the moving object in the first image by using the intra-moving-object feature point.

DETAILED DESCRIPTION OF THE INVENTION

FIRST EMBODIMENT

The first embodiment of the present invention is associated with an image processing apparatus which senses an image of a moving object from different points by using a plurality of imaging devices and detects an image area of the moving object by performing high-speed stereo image processing with a small data amount. This apparatus can be applied to, for example, the visual processing system of a moving robot.

Figure 1:
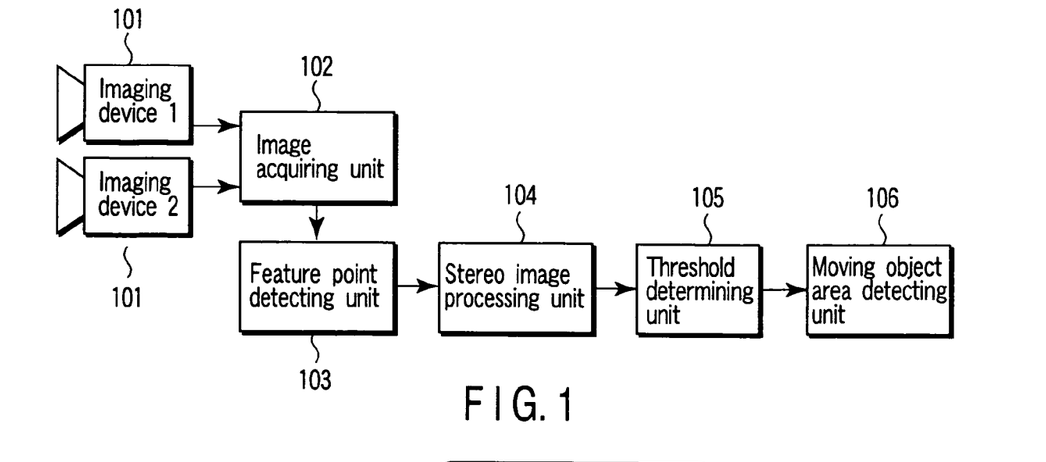
FIG. 1 is a block diagram of an image processing apparatus according to the first embodiment of the present invention.

FIG. 1 is a block diagram of an image processing apparatus according to the first embodiment of the present invention.

An imaging device (camera) 101 is a means for sensing an object image. A plurality of such devices are provided to image sense a moving object from two different viewpoints. Although FIG. 1 shows two imaging devices 101, the number of imaging devices 101 is not specifically limited as long as it is two or more.

An image acquiring unit 102 acquires video signals of the first and second images which are obtained by sensing a moving object image at two viewpoints using the imaging devices 101, and converts the signals into digital image data which can be easily processed by a computer.

A feature point detecting unit 103 detects a plurality of feature points from one of the first and second images (for example, "the first image" in this embodiment) obtained by sensing the moving object image using the plurality of imaging devices 101. Assume that in this embodiment comprising the two imaging devices 101, the first image corresponds to a left image, and the second image corresponds to a right image.

A stereo image processing unit 104 performs stereo image processing by using the first and second images acquired by the image acquiring unit 102 to obtain a disparity distribution representing the disparity for each feature point detected by the feature point detecting unit 103 as a stereo image processing result.

A threshold determining unit 105 determines a threshold for the disparities in the disparity distribution. This threshold is used to discriminate the background and the moving object on the image in accordance with the magnitude of each disparity. A plurality of feature points detected by the feature point detecting unit 103 are classified as follows. That is, each feature point having a disparity larger (nearer) than the threshold in the disparity distribution is regarded as an intra-moving-object feature point, and other feature points (farther than threshold) are regarded as intra-background feature points.

A moving object area detecting unit 106 calculates the distances from the plurality of imaging devices 101 to the moving object from the disparity of each feature point, and detects an image area of the moving object on the basis of the calculated distances.

Figure 2:
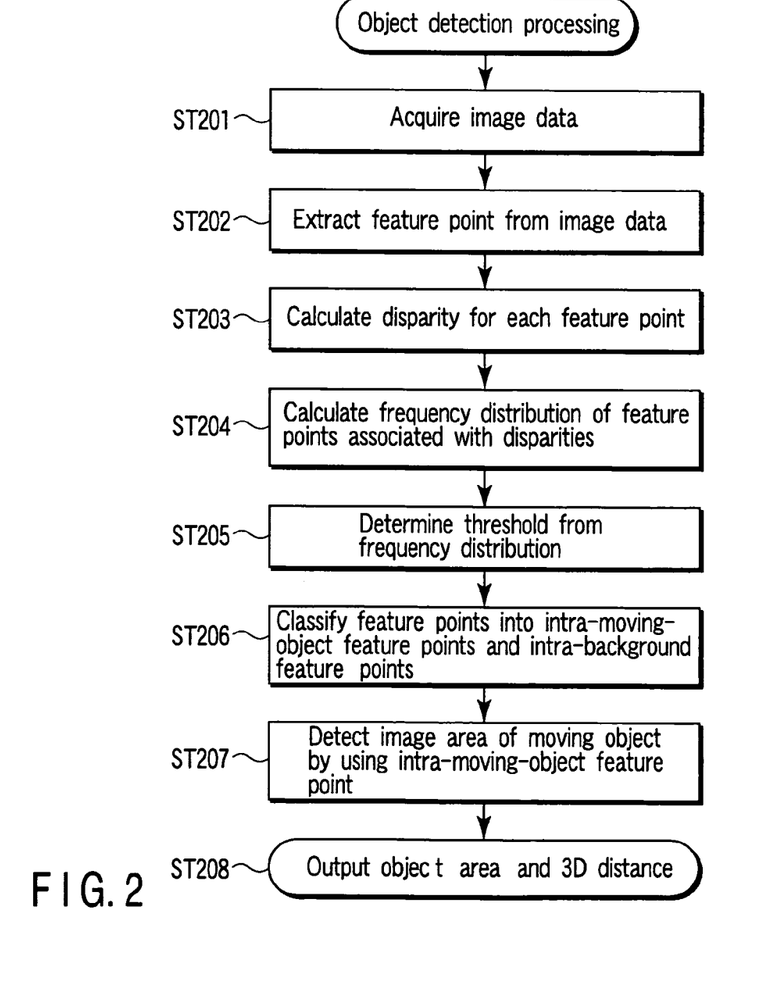
FIG. 2 is a flowchart showing a processing sequence for object detection according to the first embodiment.

The operation of this embodiment having the above arrangement will be described. FIG. 2 is a flowchart showing a processing sequence for object detection according to the first embodiment.

First of all, in step ST201, images are acquired from the plurality of imaging devices 101 in the form of digital image data through the image acquiring unit 102. Of the images corresponding to the number of imaging devices 101 which are obtained in this manner, images to be simultaneously subjected to stereo image processing are preferably images which are simultaneously sensed by all the imaging devices 101. If these imaging devices cannot simultaneously perform image sensing, a stereo image processing result (to be described later) must be corrected in accordance with image sensing timings.

In step ST202, a plurality of feature points are extracted from one (the left image in this case) of the plurality of images. A feature point in this case is a portion exhibiting a large change in luminance in the image. Several hundred such points are extracted from the image and are used for subsequent processing. This makes it possible to execute the subsequent processing stably at a high speed.

A feature point extraction method will be described below. This extraction method is to detect each point whose luminance difference from the surroundings is larger than a threshold as a feature point. First of all, one pixel in the image is selected. This point is assumed to be a point p. Consider a small area W around the point p. A matrix M is calculated with respect to this area W as follows:

$$M = \begin{bmatrix} \sum D_x^2 & \sum D_x D_y \\ \sum D_x D_y & \sum D_y^2 \end{bmatrix} \quad (1)$$

where $D_x$ and $D_y$ are luminance differences between pixels adjacent to each other in the x and y directions in the small area W. If two eigenvalues $\lambda_1$ and $\lambda_2$ in the matrix M are large, it indicates that changes in luminance around the point p are large in both the x and y directions. That is, the point p is a corner point. Therefore, a proper threshold $\lambda$ is determined in advance, and the matrix M is obtained by setting each pixel in the image as a point p. Each point p whose eigenvalues $\lambda_1$ and $\lambda_2$ are both larger than the threshold $\lambda$ is determined as a feature point. This feature point extraction method is merely an example, and it is highly probable that a correct result be obtained in block matching in subsequent stereo image processing. Note that another method can be used as long as it can extract a point exhibiting a large change in luminance in a small area in an image. For example, points obtained from an image as a result of a corner point detection algorithm or edge detection algorithm may be determined as feature points.

Figure 3:
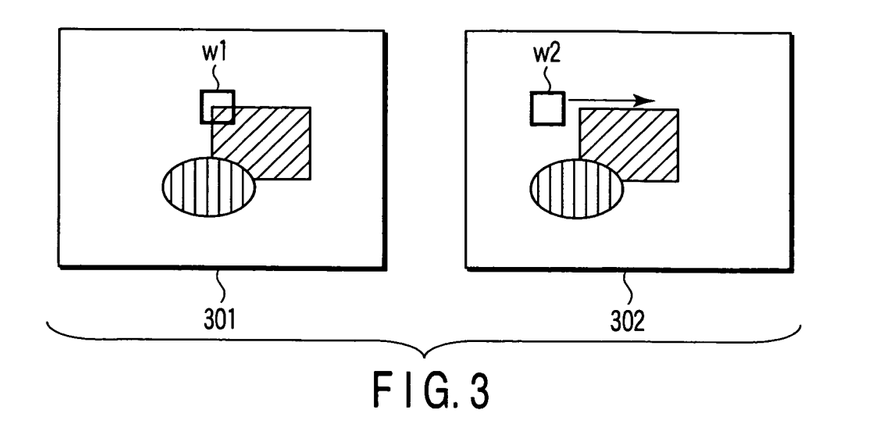
FIG. 3 is a view for explaining block matching between images.

In step ST203, stereo image processing is performed for the extracted feature points to calculate a disparity for each feature point. This stereo image processing will be described below. FIG. 3 shows images sensed by the imaging devices 101 arranged side by side. A left image 301 is sensed by the left imaging device. A right image 302 is sensed by the right imaging device. Feature points are extracted from the left image 301 in step ST202.

Figure 4:
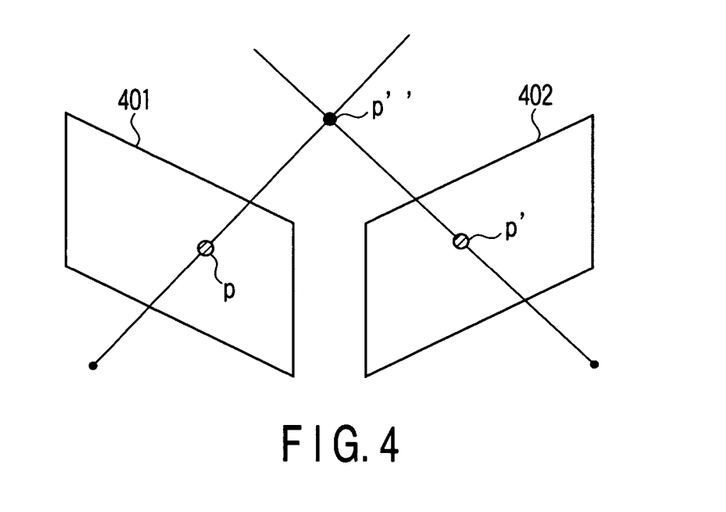
FIG. 4 is a view for explaining acquisition of 3D information by stereo image processing.

In this case, the extracted points are processed in the following manner. First of all, a small area w1 centered on each feature point of the left image 301 is determined. The size of the small area w1 is determined in advance. A small area w2 having the same size as that of the small area w1 is extracted from the right image 302 and is compared with the small area w1 to search for a portion most similar to the small area w1, i.e., a portion where the same region as that in the small area w1 is depicted. In a method of measuring the similarity between the small area w1 and the small area w2, the sum total of the absolute values of the differences between pixels in the two areas or the sum total of square errors can be used. In a search method used in a right image (a so-called corresponding point search method), if the relative positional relationship between the imaging devices 101 is known, an area corresponding to the small area w1 is limited on one straight line in the right image. In this case, a target portion can be found by obtaining similarities while moving the small area w2 on a straight line pixel by pixel. The center of the small area w2 exhibiting a highest similarity which is obtained in this manner is determined as a point p'. With the above operation, the point P' in the right image which corresponds to the feature point p can be obtained. As shown in FIG. 4, if the optical characteristics (focal lengths) of the imaging devices 101 and the positional relationship (distance) between the imaging devices 101 are known, a 3D position p" corresponding to a point p on a left image 401 and a point p' on a right image 402 can be obtained therefrom by triangulation. Referring to FIG. 4, it is obvious that as the distance between the points p and p' on the images increases, the point p" approaches the imaging devices 101. This embodiment therefore obtains, in practice, information indicating, for each feature point, by how many pixels the points p and p' are spaced apart from each other, i.e., the disparity of each feature point, and provides the information as an attribute of each feature point.

Figure 5:
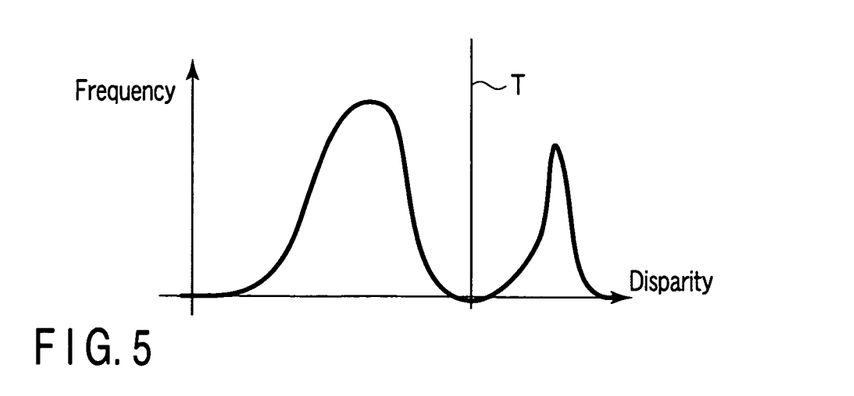
FIG. 5 is a graph showing a frequency distribution associated with disparities.

In step ST204, the frequency distribution of feature points associated with disparities is calculated. The frequency distribution of the feature points associated with the disparities is calculated in the following manner by using the disparity distribution (the stereo image processing result) obtained in step ST204 which represents a disparity for each feature point. That is, the number of feature points from a pixel with a disparity of 0 to $D_{max}$ pixels (determined in advance) is counted. If a moving object is present in front of the background, a frequency distribution obtained at this stage is assumed to be roughly divided into two parts having peaks, as shown in FIG. 5. In this case, feature points belonging to the part with larger disparities can be regarded as feature points on the moving object.

In step ST205, a disparity threshold T for dividing the frequency distribution shown in FIG. 5 which is associated with disparities into two parts having peaks is obtained. The threshold T is determined, for example, in the following manner. Assume first that the threshold T (disparity) is 0. The feature points can be classified into two classes, i.e., feature points with disparities equal to or smaller than the threshold T and feature points with disparities larger than the threshold T, according to the assumed threshold T. A variance $\delta_W^2$ of disparities in the two divided classes of feature points and a variance $\delta_B^2$ between the two classes are obtained, and the ratio of the two variances is calculated as follows:

$$\eta = \frac{\delta_B^2}{\delta_W^2 + \delta_B^2} \quad (2)$$

One of the disparities from 0 to $D_{max}$ with which $\eta$ is maximized is determined as the threshold T.

In step ST206, the feature points are classified into two groups on the assumption that the frequency distribution associated with the disparities at the feature points is roughly divided into two parts having peaks. That is, as a result of comparison with the threshold T determined in step ST205, feature points having disparities equal to or smaller than the threshold T are classified as intra-background feature points, and feature points having disparities larger than the threshold T are classified as intra-moving-object feature points.

Figure 6:
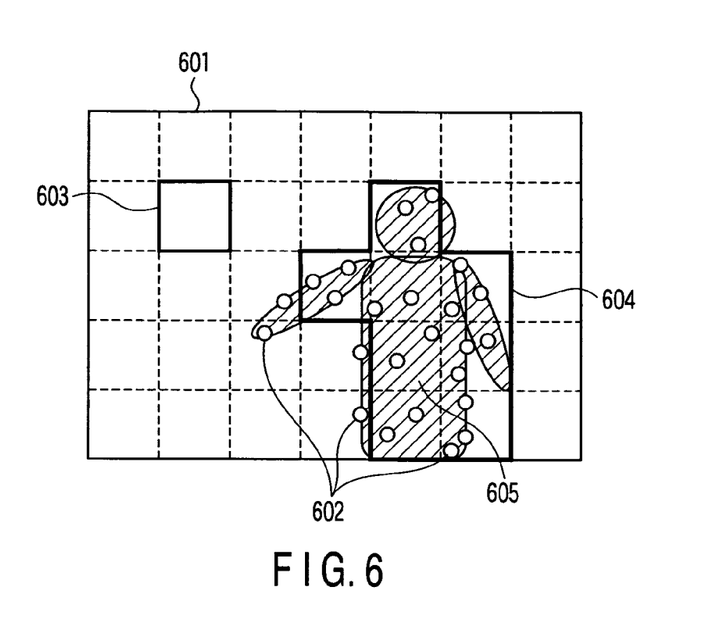
FIG. 6 is a graph for explaining a method of obtaining an object area from a set of feature points.

In step ST207, the image area occupied by a moving object in the image is obtained from the feature points classified as the intra-moving-object feature points. This method will be described with reference to FIG. 6. Referring to FIG. 6, assume that an image 601 is an image, of the images sensed by the imaging devices 101, in which feature point extraction is performed, and a person 605 is included in the image. Assume that as a result of the processing up to step ST206, feature points 602 classified as intra-moving-object feature points are obtained. First of all, the entire image is divided into a plurality of large blocks 603. The size of each divided block 603 is determined in advance. The number of intra-moving-object feature points in each divided block 603 is counted. If the number of a given block is equal to or more than a predetermined number, it is determined that the block is an area occupied by the moving object. After determination of all the blocks, any block which is determined to be a moving object area is removed if all the adjacent blocks are not moving object areas, and the remaining area is determined to a moving object area 604.

Lastly, the processing result is output in step ST208. The moving object area in the image which is obtained in step S207 and the 3D positional information from the imaging devices 101 are output. The 3D positional information of the moving object is obtained, as shown in FIG. 4 from the stereo image processing result, i.e., the disparity, of a point selected from the intra-moving-object feature points on the condition that, for example, the point is near the center of gravity of the area. The obtained information is then output. With the above processing, a rough relative positional relationship between the area and the moving object and the distance between the two can be obtained.

According to the first embodiment of the present invention described above, the distance information from each imaging device 101 to a moving object is obtained, and the moving object can be detected from the image while being discriminated from the background. In this processing, feature points exhibiting large changes in luminance which are extracted from the image are used. This makes it possible to stably perform stereo image processing and realize high-speed processing by reducing data to be processed.

SECOND EMBODIMENT

Figure 7:
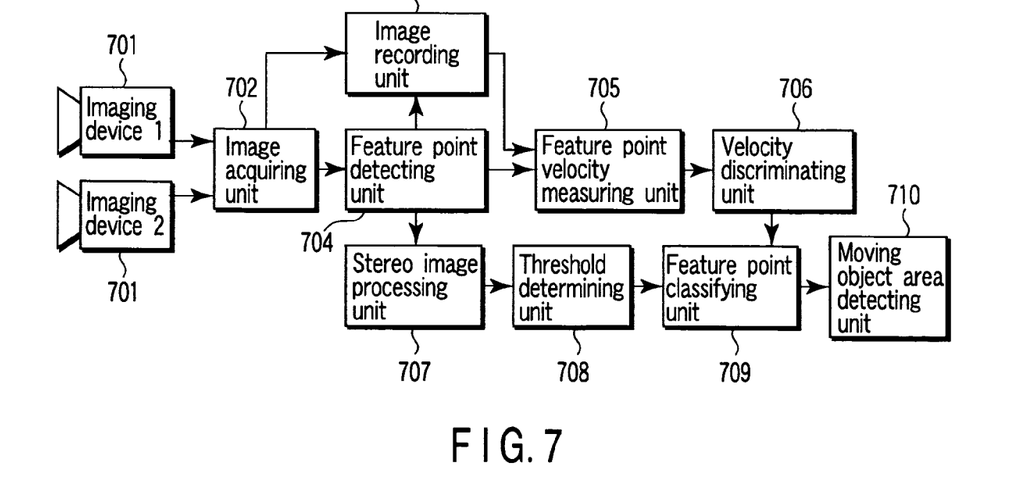
FIG. 7 is a block diagram of an image processing apparatus according to the second embodiment of the present invention.

FIG. 7 is a block diagram of an image processing apparatus according to the second embodiment of the present invention. This embodiment differs from the first embodiment in that it acquires not only the disparity information but also velocity information of each feature point in an image, and performs determination on the basis of the velocity information. Velocity information is targeted to discrimination based on not only the magnitude of a velocity but also its direction. The second embodiment is therefore especially effective for image processing in an apparatus arrangement in which imaging devices 101 move, such as a moving robot.

An image recording unit 703 records image data at a previous frame time to obtain the moving velocity of a feature point between frames.

A feature point velocity measuring unit 705 obtains a pair of corresponding feature points between the image recorded on the image recording unit 703 at the immediately preceding frame time and the image sensed at a new frame time, and obtains a moving velocity distribution representing a moving velocity for each pair of feature points by measuring the moving velocity represented by a moving amount and moving direction between each pair of feature points.

A velocity discriminating unit 706 determines an identification boundary for identifying a moving object area or an area other than the moving object area with respect to the moving velocity distribution, and discriminates a feature point corresponding to the moving object area by using the identification boundary (discrimination based on velocity).

A feature point classifying unit 709 combines the discrimination results based on disparity and velocity. More specifically, feature points having disparities exceeding a threshold in a disparity distribution and feature points corresponding to the moving object area identified by an identification boundary are classified as intra-moving-object feature points.

Since other constituent elements are the same as those in the first embodiment described above, a description thereof will be omitted.

Figure 8:
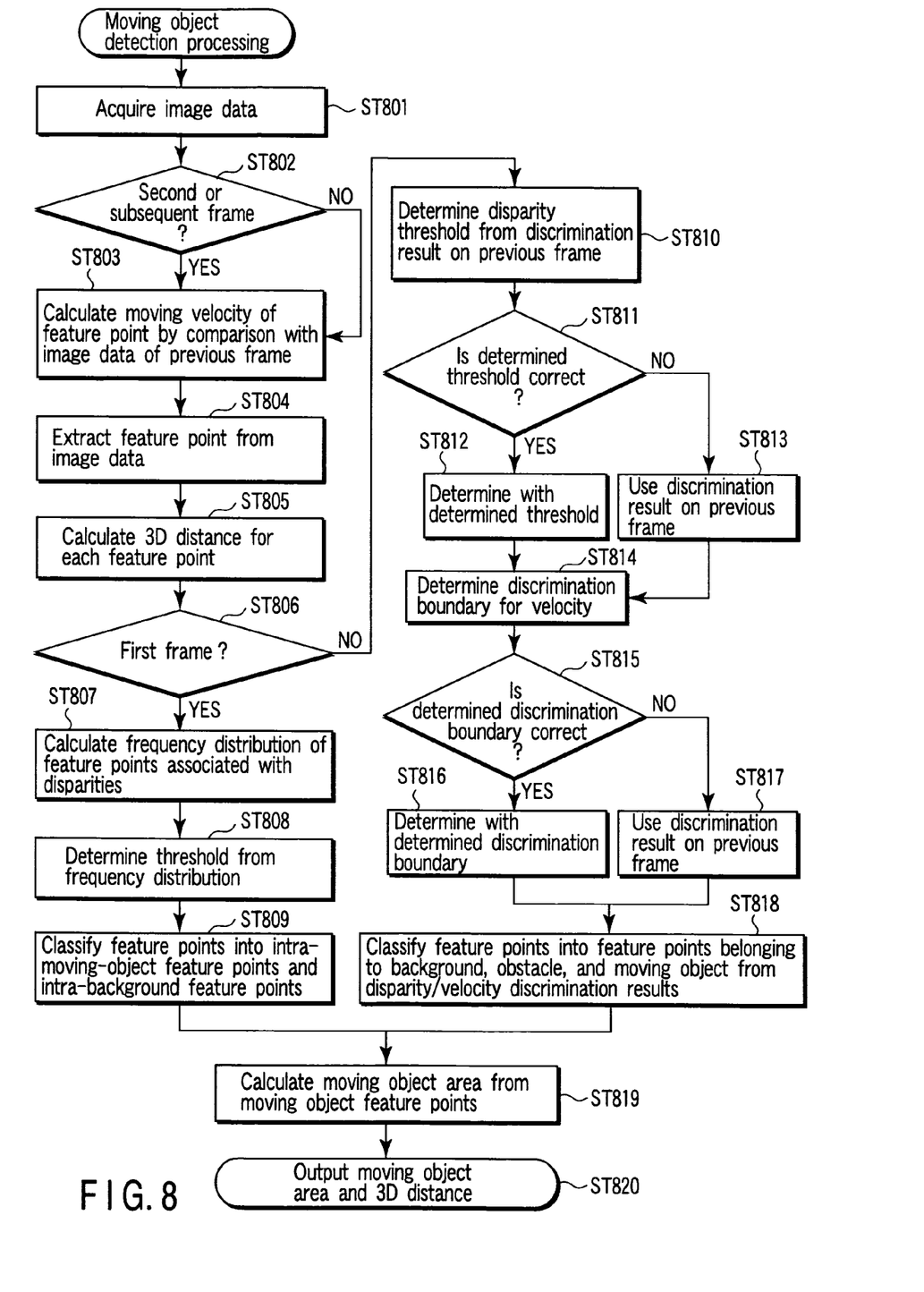
FIG. 8 is a flowchart showing a processing sequence for moving object detection according to the second embodiment.

The operation of this embodiment having the above arrangement will be described. FIG. 8 is a flowchart showing a processing sequence for moving object detection according to the second embodiment. The processing from step ST801 to step ST805 is basically the same as that in the first embodiment. In step ST803, at the second or subsequent frame time, however, the moving velocity of a feature point between adjacent frames is obtained by using the image at the immediately preceding frame, recorded on the image recording unit 703, and the image newly obtained from an imaging device 701. As a specific example of a technique of obtaining a moving velocity, a technique based on block matching will be described. First of all, a portion around a feature point is extracted as a block from the image of the previous frame. A predetermined range in the new image is searched for a portion most similar to this block. A block size and search range necessary for this processing are determined in advance. As a criterion for similarity with an image block, the sum total of the absolute values of the differences or the sum total of square errors can be used as in stereo image processing. This makes it possible to obtain information indicating to where in the new frame a feature point in the previous frame has moved. In this case, if the highest similarity is equal to or less than a predetermined value, it is determined that no feature point is found, and the corresponding point is excluded from feature points. With the above processing, velocity information is added to each remaining feature point. Note that another method can be used as long as information indicating the movement of a feature point between two frames can be obtained. For example, an algorithm for obtaining an optical flow between the images of different frames like a generally known algorithm can be used. An optical flow is described in, for example, the following reference: Lucas, B. and Kanade T., "An Interactive Image Registration Technique with an Application to Stereo Vision", in Proc. DARPA Image Understanding Workshop, 1981.

A technique for feature point extraction in step ST804 is itself the same as that in the first embodiment. However, at the second or subsequent frame, step ST804 is executed for more feature points only when the number of feature points becomes equal to or less than a predetermined number. Step ST805 is the same as that in the first embodiment, and hence a description thereof will be omitted. Step ST806 is a step of checking whether the current processing is for the first frame. Since the velocity information of a feature point cannot be used unless the processing is for the second or subsequent frame, different kinds of processing are selectively performed. In the case of the first frame, a moving object is discriminated from the background in accordance with the distribution of disparities of the respective feature points as in the first embodiment. For this reason, the processing from step ST807 to step ST809 is the same as in the first embodiment, and hence a description thereof will be omitted. Processing for the second or subsequent frame will be described below.

The disparity obtained by image processing is provided in advance for each feature point in the second or subsequent frame. In addition, a moving velocity from the previous frame is also provided in advance for each feature point exhibiting success in block matching with the image of the previous frame. Each feature point on the moving object is discriminated from a set of feature points by using these pieces of information. First of all, in step ST810, in order to perform discrimination based on disparity, a threshold for classifying the set of feature points into background points and other points is determined. In this case, a threshold is determined in accordance with the discrimination result on the previous frame. That is, a threshold is determined to classify background feature points in the previous frame as background in the new frame and classify feature points other than the background feature points in the previous frame as feature points other than the background in the new frame. This operation is equivalent to learning a discrimination boundary by using the discrimination result on the previous frame as a training data. A specific example of a technique of realizing this learning will be described below. First of all, a proper value such as the average value of 0 and a maximum value $D_{max}$ or a threshold for the previous frame is set in advance as the initial value of the threshold. In addition, a constant $\alpha$ representing the degree of learning is determined in advance. Determination based on a threshold at the current time point is performed for all the feature points in the previous frame for which a discrimination result has been provided, thereby checking whether the determination result coincides with the discrimination result on the previous frame. If they coincide with each other, the threshold is kept unchanged. Only when a wrong discrimination is made, the threshold is corrected. The correction is made as follows. Letting d be the disparity of a feature point corresponding to wrong discrimination, T be a threshold in this case, and T' is a new threshold, $T'=T+\alpha d$ is set if a feature point which should be determined to be a background feature point is discriminated as a point other than the background, i.e., the threshold is too small. In contrast to this, if the threshold is too large, the threshold is corrected to $T'=T-\alpha d$. This operation is repeated a predetermined number of times for all the feature points for which the discrimination result on the previous frame has been provided. If no error is found in all the feature points, the processing is terminated at this point of time. Otherwise, after this operation is repeated a predetermined number of times, the processing is terminated. As a consequence, a disparity threshold is determined. Note that the threshold determination technique described above is merely an example. Any of such techniques can be used as long as it is a supervised learning technique.

Although a threshold for discrimination using disparities is determined in step ST810, if, for example, the distance between the background and a moving object is small, it is difficult to perform discrimination by disparity threshold processing. For this reason, it is determined in step ST811 whether the determined disparity threshold is really effective. A specific technique for this operation will be described below. Determination is performed again by using feature points having a discrimination result on the previous frame, and the number of feature points exhibiting wrong determination is counted. If the counted number is equal to or more than a predetermined ratio, it is determined that the disparity threshold is not effective, and the discrimination result on the previous frame is used without any change (ST812). A feature point without information on the previous frame is labeled as "undiscriminated". If the number of errors is equal to or less than a predetermined number, it is determined by using the threshold determined by learning whether the feature point is a background feature point or a feature point other than background feature points. Discrimination is then performed for a newly added feature point having no discrimination result on the previous frame, and the point is labeled as "background" or "other than background" depending on comparison with the threshold (ST813).

In step ST814 and the subsequent steps, an identification boundary for identifying a moving object area or an area other than the moving object area with respect to the distribution of the moving velocities of feature points is determined, and feature points having disparities exceeding a threshold in a disparity distribution and feature points corresponding to a moving object are identified by the identification boundary are classified as intra-moving-object feature points. In this case, a discrimination boundary is dynamically determined in consideration of not only the magnitudes but also the directions of velocities. This technique is therefore effective even for image processing implemented in a still object which produces apparent movement on an image, e.g., a moving robot.

First of all, in step ST814, a velocity is regarded as two-dimensional data comprising a magnitude and a direction, and an equation for a boundary line for classifying data in a two-dimensional space (plane) into still object data and moving object data is obtained. According to a specific method for this operation, as in step ST810, a boundary is corrected only at the occurrence of a discrimination error by using the discrimination result on the previous frame as training data. This step differs from step ST810 in that the equation of a straight line representing a boundary line is corrected instead of a threshold. In this case, similar processing can be performed if d in the description of step ST810 is regarded as a velocity vector. With the above operation, a boundary line on a two-dimensional plane representing velocities is determined. Note that a boundary line can be determined by another method as long as it is a supervised learning technique.

In step ST815, it is determined whether the boundary line determined in step ST814 is effective. If, for example, a moving object stops by accident, the apparent movement in an image becomes the same as that of a still object. This makes it impossible to perform discrimination based on velocity. The same discrimination method as that in step ST811 is used, and the number of errors is counted by performing discrimination again with respect to feature points having information on the previous frame. If the counted number is equal to or more than a predetermined ratio, the flow advances to step ST817 to determine, in accordance with the determination result on the previous frame, whether the object is a still object or a moving object. If the number of errors is smaller than the predetermined ratio, the flow advances to step ST816 to classify feature points into two classes depending on the position of each point with respect to the determined boundary line. Of the classified two sets of feature points, a set including many feature points labeled as "background" by the discrimination based on disparity in steps up to step ST813 is discriminated as a still object, and a set including a smaller number of such feature points is discriminated as a moving object.

In step ST818, feature points are classified by combining the discrimination results based on the disparities and velocities of the feature points in steps up to step ST818. First of all, feature points classified as intra-background feature points by determination based on disparity are kept determined to be feature points belonging to "background". In contrast, feature points which are classified as intra-moving-object feature points by discrimination based on disparity but are discriminated as "still object" by discrimination based on velocity are determined to be feature points belonging to "obstacle". In addition, only feature points which are classified as intra-moving-object feature points on the basis of a disparity distribution and are also discriminated as "moving object" by discrimination based on velocity are determined to be a target "moving object". By discriminating near and distant objects other than moving objects, target information and important obstacle information can be simultaneously acquired in an embodiment directed to a moving robot.

With the above processing, in the case of the first frame, a set of feature points belonging to "moving object" is obtained as in the case of the second or subsequent frame. In step ST819, an area occupied by the moving image in the image can be obtained. In addition, in step ST820, the obtained moving object area and the relative distance from each imaging device 701 are obtained and output. These operations are the same as those in the first embodiment, and hence a description thereof will be omitted.

According to the second embodiment described above, according to the second embodiment, even under a situation in which the imaging devices 701 themselves move, a moving object can be kept detected stably. In addition, since a learning result empirically obtained from a time in the past is applied to new feature points, this technique is robust against even an unstable situation in which feature points keep changing. In addition, dynamically determining whether to use two feature amounts, i.e., the disparity amount and moving velocity of each feature point for discrimination makes it possible to stably cope with even a situation in which the moving direction and velocity of a moving object, a positional relationship with the background object, and the like sequentially change.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   an image acquiring device which acquires a first image and a second image obtained on a frame basis by sensing an image of a moving object from two different viewpoints using a first imaging device and a second imaging device;
   a first detecting device configured to detect a plurality of feature points from the first image;
   a stereo image processing device configured to obtain a disparity distribution representing a disparity for said each feature point by performing stereo image processing using the first image and the second image;
   a first determining device configured to determine a threshold for the disparities in the disparity distribution;
   a matching device configured to obtain a pair of corresponding feature points from each feature point detected at a first frame time and each feature point detected at a second frame time by the first detecting device;
   a measuring device configured to measure a moving velocity represented by a moving amount and moving direction between the pair of feature points to obtain a moving velocity distribution representing a moving velocity for each feature point by measuring;
   a second determining device configured to determine an identification boundary for identifying a moving object area or an area other than the moving object area with respect to the moving velocity distribution;
   a classifying device configured to classify, as intra-moving-object feature points, a feature point having a disparity exceeding the threshold in the disparity distribution and a feature point corresponding to a moving object area identified by the identification boundary; and
   a second detecting device configured to detect an image area of the moving object in the first image by using the intra-moving-object feature points,
   wherein the first determining device determines a threshold for the disparity on the basis of a ratio between a variance of disparities in two classes into which said plurality of feature points are classified, and a variance of disparities between the classes.

2. An apparatus according to claim 1, wherein the first detecting device detects as a feature point a point exhibiting a luminance difference from a surrounding which is not less than a threshold.

3. An apparatus according to claim 1, wherein the first determining device determines a threshold for the disparity by learning by using, as a training signal, a feature point classification result calculated in a previous frame by the classifying device.

4. An apparatus according to claim 3, further comprising a third determining device configured to determine effectiveness of a threshold determined by the first determining device.

5. An apparatus according to claim 4, wherein the matching device obtains the pair of feature points by block matching.

6. An apparatus according to claim 5, further comprising:
   a counting device configured to count said plurality of feature points obtained by the matching device, and
   a control device configured to add a new feature point when no pair of corresponding feature points are obtained by the block matching.

7. An apparatus according to claim 1, wherein the second determining device determines the identification boundary by learning using a classification result from the classifying device as a training signal.

8. An apparatus according to claim 7, further comprising a fourth determining device configured to determine effectiveness of an identification boundary determined by the second determining device,
 wherein the classifying device determines whether the identification boundary is used or an identification boundary for a previous frame time is used.

9. An apparatus according to claim 1, wherein the second detecting device divides the first image into a plurality of blocks, counts the intra-moving-object feature points in the block, and detects a block including the intra-moving-object feature points by a number not less than a predetermined number as an image area of the moving object.

10. An apparatus according to claim 1, further comprising a calculating device configured to calculate distances from the first imaging device and the second imaging device to the moving object in accordance with disparities of the intra-moving-object feature points, optical characteristics of the first imaging device and the second imaging device, and a distance between the first imaging device and the second imaging device.

11. An image processing method, comprising:
 acquiring a first image and a second image obtained on a frame basis by sensing an image of a moving object from two different viewpoints using a first imaging device and a second imaging device;
 detecting a plurality of feature points from the first image;
 obtaining a disparity distribution representing a disparity for said each feature point by performing stereo image processing using the first image and the second image;
 determining a threshold for the disparities in the disparity distribution;
 obtaining a pair of corresponding feature points from each feature point detected at a first frame time and each feature point detected at a second frame time;
 measuring a moving velocity represented by a moving amount and moving direction between the pair of feature points to obtain a moving velocity distribution representing a moving velocity for each feature point by:
 determining an identification boundary for identifying a moving object area or an area other than moving object area with respect to the moving velocity distribution;
 classifying, as intra-moving-object feature points, a feature point having a disparity exceeding the threshold in the disparity distribution and a feature point corresponding to a moving object area identified by the identification boundary; and
 detecting an image area of the moving object in the first image by using the intra-moving-object feature points,
 wherein the first determining device determines a threshold for the disparity on the basis of a ratio between a variance of disparities in two classes into which said plurality of feature points are classified, and a variance of disparities between the classes.

* * * * *